US012730875B2

United States Patent
Martick

(10) Patent No.: US 12,730,875 B2
(45) Date of Patent: Sep. 8, 2026

(54) SYSTEMS AND METHODS FOR SOFTWARE AUTHENTICATION WITHOUT PROVIDING FULL SOFTWARE DISCLOSURE TO A SOFTWARE NOTARIZER

(71) Applicant: SAP SE, Walldorf (DE)

(72) Inventor: Christian Martick, Wendisch Rietz (DE)

(73) Assignee: SAP SE, Walldorf (DE)

(*) Notice: Subject to any disclaimer, the term of this patent is extended or adjusted under 35 U.S.C. 154(b) by 117 days.

(21) Appl. No.: 18/526,873

(22) Filed: Dec. 1, 2023

(65) Prior Publication Data

US 2025/0181697 A1 Jun. 5, 2025

(51) Int. Cl.
*G06F 21/44* (2013.01)

(52) U.S. Cl.
CPC .................................... *G06F 21/44* (2013.01)

(58) Field of Classification Search
CPC ....................................................... G06F 21/44
See application file for complete search history.

(56) References Cited

U.S. PATENT DOCUMENTS 10,505,741 B1 * 12/2019 Conley ................. H04L 63/123
11,153,074 B1 * 10/2021 Nikitas ..................... H04L 9/50
11,423,498 B2 * 8/2022 Kraemer .............. G06Q 50/184
2003/0093678 A1 * 5/2003 Bowe .................... H04L 9/3236 713/180
2008/0010287 A1 * 1/2008 Hinton .................... H04L 61/30
2012/0254624 A1 * 10/2012 Malkhasyan ......... G06F 21/572 713/189
2015/0319671 A1 * 11/2015 Nakatsugawa .......... H04B 7/14 370/315
2017/0279611 A1 * 9/2017 Kraemer .............. G06Q 20/065
2018/0285570 A1 * 10/2018 Leblanc ........... G01N 27/44791
2019/0057115 A1 * 2/2019 Liu ..................... G06F 16/1834
2019/0260574 A1 * 8/2019 Shi .......................... H04L 9/321
2020/0028945 A1 * 1/2020 Allen ...................... H04L 67/61
2020/0186506 A1 * 6/2020 Shockley .................. H04L 9/14
2022/0029822 A1 * 1/2022 Ubbens ................... G06F 16/27

(Continued)

FOREIGN PATENT DOCUMENTS

EP 2073142 A2 * 6/2009 ........... G06F 21/606
EP 4290393 A1 * 12/2023 ............ G06F 16/25

(Continued)

OTHER PUBLICATIONS

Michael Backes et al, Achieving Security Despite Compromise using Zero-Knowledge, Saarland University, Germany, pp. 1-69 (Year: 2009).*

*Primary Examiner* — Abu S Sholeman
(74) *Attorney, Agent, or Firm* — Fountainhead Law Group, PC

(57) ABSTRACT

Embodiments describe techniques for authenticating software artifacts in a secure manner that does not require the software notarizer accessing or storing any software artifact data. A proof algorithm may be utilized by the software vendor and the software notarizer in generating the disclosure-free notarization certificate. The same proof algorithm may then be utilized by the software consumer during validation of the software artifact. These techniques may improve the software security since access to data from the software artifact is limited to the software vendor and the software consumer.

9 Claims, 8 Drawing Sheets

(56) References Cited

U.S. PATENT DOCUMENTS

2023/0208654 A1* 6/2023 Chao .................... H04L 9/3268
713/156
2024/0086503 A1* 3/2024 Chodroff ............... G06Q 50/40

FOREIGN PATENT DOCUMENTS

WO WO-2019186546 A1 * 10/2019 ......... G06F 12/1408
WO WO-2022087239 A1 * 4/2022 ......... H04L 67/1001
WO WO-2024102897 A1 * 5/2024 ........... H04L 63/164
WO WO-2024173547 A2 * 8/2024 ......... H04L 63/0823

* cited by examiner

100A

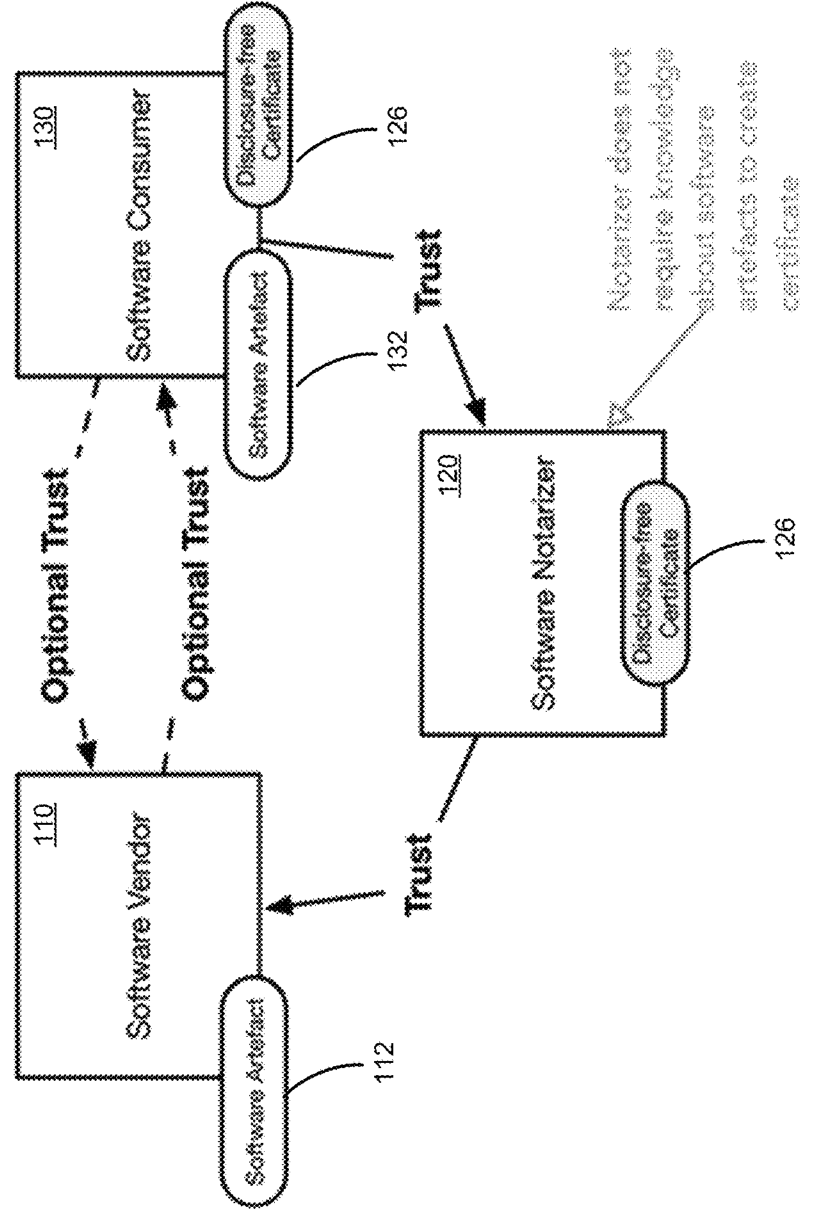
Fig. 1b

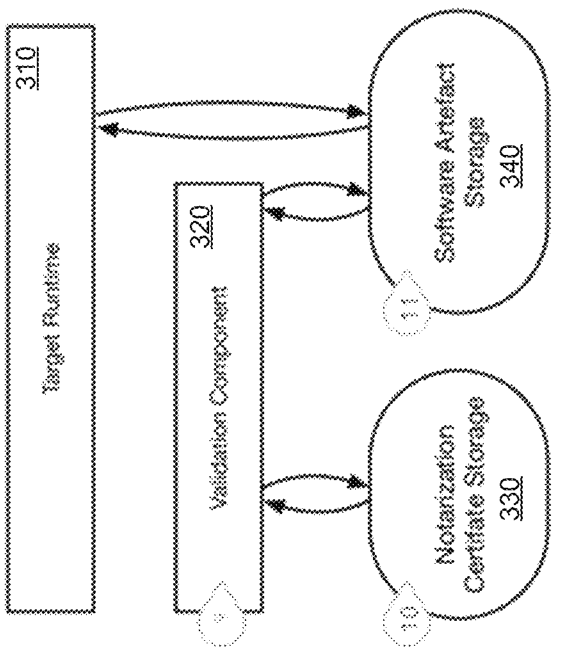
Software Consumer
*Fig. 3*

SYSTEMS AND METHODS FOR SOFTWARE AUTHENTICATION WITHOUT PROVIDING FULL SOFTWARE DISCLOSURE TO A SOFTWARE NOTARIZER

BACKGROUND

Unless otherwise indicated herein, the approaches described in this section are not prior art to the claims in this application and are not admitted to be prior art by inclusion in this section.

In the dynamic world of software development, it's important for software vendors to implement robust mechanisms that allow software consumers to verify the authenticity and integrity of the software artifacts they run. This verification provides evidence that the software artifacts have not been tampered with or altered in any unauthorized manner. This proof of authenticity and correctness is even more crucial in an enterprise context, where the stakes are high due to strict compliance, traceability, and auditability demands. A software vendor may incorporate a software notarizer in the verification workflow to assist in software authentication. However, the software vendor may have concerns about exposing the software artifacts to the software notarizer since the software artifacts contain proprietary information and trade secrets. Therefore, the software vendor may wish to limit exposure of these software artifacts to the smallest number of parties possible.

BRIEF DESCRIPTION OF THE DRAWINGS

FIG. 1*b* illustrates another system for authenticating a software artifact according to some embodiments.

FIG. 3 illustrates a system for authenticating a disclosure-free notarization certificate according to some embodiments.

DETAILED DESCRIPTION

Described herein are methods and apparatuses to authenticate software artifacts in a secure manner that does not require sharing the software artifact with a software notarizer. Software notarizers may be utilized by the software vendor to assist in the authentication of software artifacts on the consumer side. It may be advantageous to reduce the number of parties that have access to the software artifact to reduce the likelihood that proprietary information or trade secrets in the software artifact are exposed. In some embodiments, a software notarizer may communicate with a software vendor to generate a disclosure-free notarization certificate. Herein, the disclosure-free notarization certificate may be called a disclosure-free certificate, notarization certificate, or simply a certificate. Generation of the disclosure-free notarization certificate may exclude the software vendor sharing data of software artifact with the software notarizer. This may be advantageous as it reduces the likelihood that trade secrets or proprietary information in the software artifact is misappropriated. The software notarizer may share the disclosure-free notarization certificate with a consumer when validating or verifying the software artifact on the consumer side. Validation and verification may be used interchangeably herein. Verification may be required before the software artifact may be run on the consumer side either the first time or every time. It will be evident, however, to one skilled in the art that embodiments as defined by the claims may include some or all of the features in these examples alone or in combination with other features described below, and may further include modifications and equivalents of the features and concepts described herein.

Figure 1A:
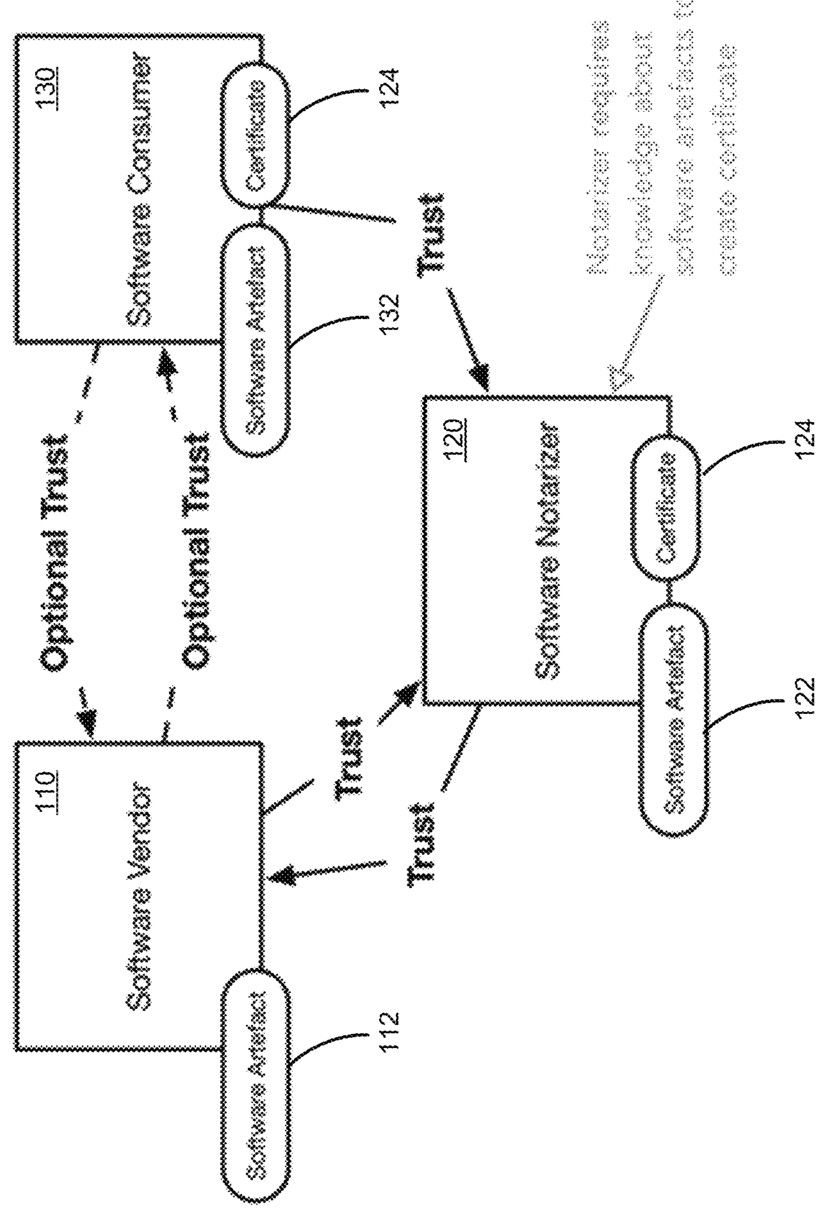
FIG. 1*a* illustrates a system for authenticating a software artifact according to some embodiments.

FIG. 1*a* illustrates a system for authenticating a software artifact according to some embodiments. System 100A includes software vendor 110, software notarizer 120, and software consumer 130. Software vendor 110 includes software artifact 112, software notarizer includes software artifact 122 and notarization certificate 124, and software consumer 130 includes software artifact 132 and notarization certificate 124. Here, software notarizer 120 acts as an intermediary between the software vendor 110 and the software consumer 130 to verify the validity of a software artifact. The complete process of creating a notarization certificate is outsourced from the software vendor 110 to the software notarizer 120 so therefore, the software notarizer 120 should be trusted by the software vendor 110 (trust arrow pointing from software vendor 110 to software notarizer 120) as the software vendor 110 delegates the notarization processes and shares software artefacts with the software notarizer 120 for purposes of generating a cryptographically strong fingerprint in the form of the notarization certificate which will be used to authenticate the software artifact the software consumer 130 wishes to run. Furthermore, the software vendor 110 should be trusted by the software notarizer 120 (trust arrow pointing from software notarizer 120 to software vendor 110) since the software notarizer 120 is receiving software artifact 122 from software vendor 110. In most cases, the meta information of the notarization certificate 124 will now also include the notarizer as entity (even using cryptographically secure signatures). With the two-way trust relationship between software notarizer 120 and software vendor 110, the software consumer 130 does now not have to trust the software vendor 110, but instead have a trust relationship with the software notarizer 120 since the software vendor needs to trust that the software notarizer 120 is providing an accurate notarization certificate 124 to the software consumer 130 for purposes of authenticating software artifact 132.

When a software artifact 132 is supposed to be deployed at consumer side, the software consumer 130 now asks the software notarizer 120 for the respective notarization certificate 124 in order to locally verify the authenticity and the tamper proof content of software artifact 132. While the delegation of trust is a positive outcomes in this case, the software vendors are required to introduce a level of trust with another third party (namely the notarizer) by providing the actual software artefacts. As those might include trade secrets or specific details a software vendor would not like to expose to third parties outside of a license usage agreement, the risk for the software vendor might increase in this case.

FIG. 1*b* illustrates another system for authenticating a software artifact according to some embodiments. Similar to system 100A, system 100B includes software vendor 110, software notarizer 120, and software consumer 130. Software vendor 110 includes software artifact 112, software notarizer includes disclosure-free certificate 126, and software consumer 130 includes software artifact 132 and disclosure-free certificate 126. Here, software notarizer 120 acts as an intermediary between the software vendor 110 and the software consumer 130 to verify the validity of a software artifact but the software notarizer 120 does not require knowledge about software artifact 112 to create disclosure-free certificate 126. Since no knowledge is required about software artifact 112, software vendor 110 does not need to trust software notarizer 120. However, software notarizer 120 does trust software vendor 110 (trust arrow between software notarizer 120 and software vendor 110) because software notarizer is still in communication with software vendor 110 during the disclosure-free certificate generation process and thus needs to trust that the software vendor 110 is providing honest and accurate information. Software consumer 130 still trusts the software notarizer 120 because software consumer 130 receives disclosure-free certificate 126 from software notarizer 120 for purposes of authenticating software artifact 132. Software artifact 132 may have been received from software vendor 110. In some embodiments, the trust relationship where software vendor 110 trusts software notarizer 120 in system 100A is replaced by a specific process of artifact proof that allows the software notarizer 120 to create cryptographically strong certificates without the need of access to software artifact 112. This newly introduced disclosure-free certificate can then be used by software consumers to validate authenticity and the non-tampered nature of the respective software.

Figure 2:
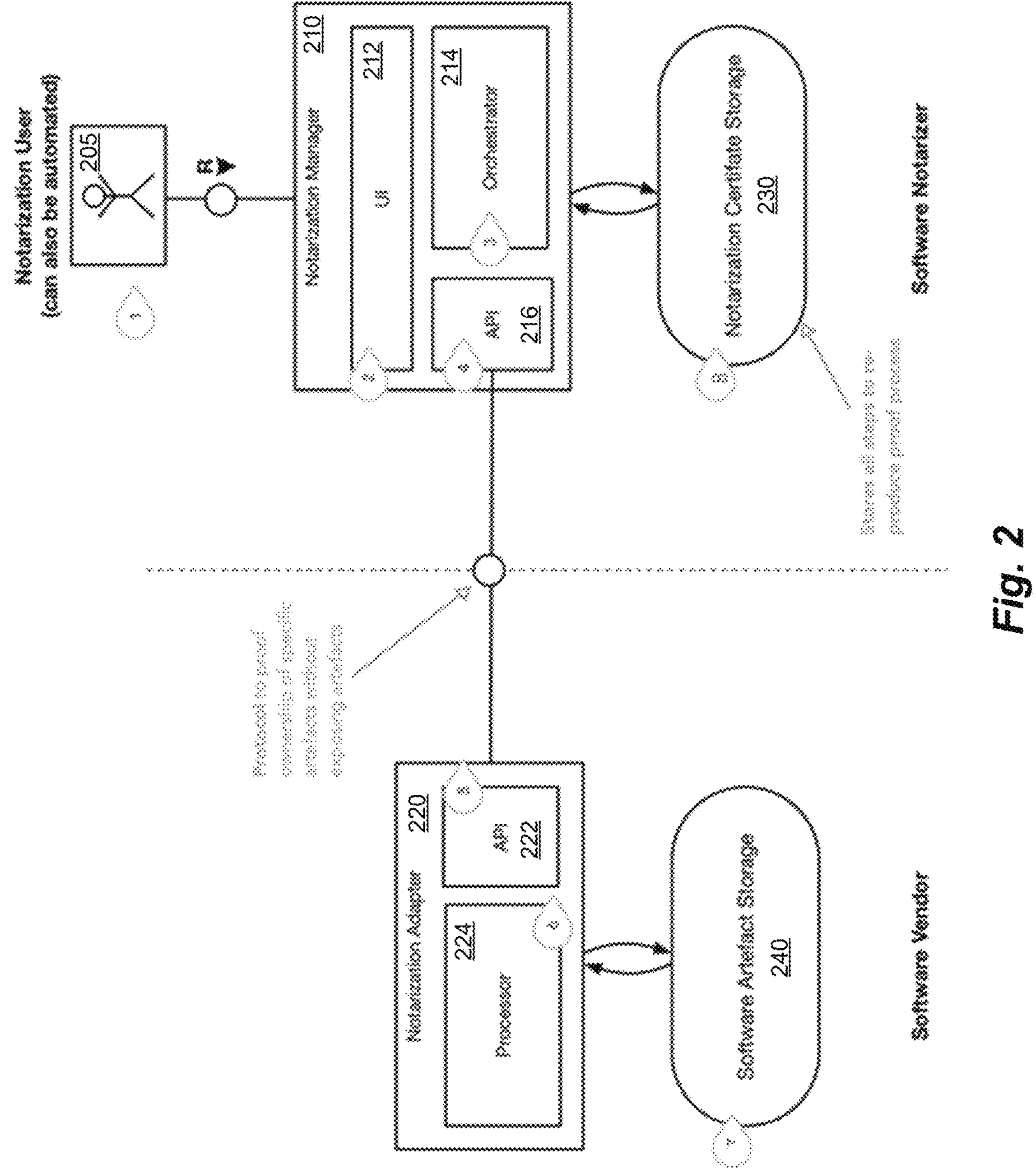
FIG. 2 illustrates a system for generating a disclosure-free notarization certificate according to some embodiments.

FIG. 2 illustrates a system for generating a disclosure-free notarization certificate according to some embodiments. Generation of the disclosure-free notarization certificate may take place between the software vendor and the software notarizer. On the software vendor side, system 200 includes notarization adapter 220 and software artifact storage 240. In one embodiment, notarization adapter 220 may be a light-weight server component. Notarization adapter 220 may have access to the software artifacts belonging to the software vendor via any implementation of a software artifact storage 240 (e.g., filesystem, central network attached storage, etc.). Notarization adapter 220 may include processor 224 to process all requests and an application programming interface (API) 222 configured to receive queries from the software notarizer size and in general, communicate with the software notarizer side.

On software notarizer side, system 200 includes notarization manager 210 and notarization certificate storage 230. In one embodiment, notarization manager 210 may be operated by a user. In another embodiment, notarization manager 210 may be automated in response to a request from the software vendor to generate a new notarization certificate for a software artifact. In one example, the request may be generated when a new version of the software is available for consumers. In another example, the request may be generated when a new version of the software is created. Notarization manager 210 may include UI 212, orchestrator 214, and API 216. Orchestrator 214 may execute interactions and trigger API 216 for protocol interactions between the software vendor side and the software notarizer side. In instances where the notarization manager 210 is operated through a user, then user interface 212 may receive instructions from user 205. In one embodiment, required protocol-related steps and instructions that are needed for the generation of the disclosure-free certificates may be stored in notarization certificate storage 230. Notarization certificate storage 230 may also store the generated certificates themselves. In other embodiments, the steps and instructions may be stored in other storage accessible by notarization manager 210.

As shown in FIG. 2, the process for generating a notarization certificate may begin when the software vendor notifies user 205 that it has an artifact ready to notarize (1). User 205 may then enter the metadata via the UI 212 (2). Orchestrator 214 may receive the metadata and initiate the notarization protocol which may include the proof algorithm (3). The proof algorithm is the technique that may be used during notarization and is embedded in the notarization protocol. In other words, the notarization protocol may include the complete process to notarize the artefact after handshaking, while the proof algorithm may govern the proof for smaller parts of the overall artefact. Orchestrator may communicate the notarization protocol with the software vendor side through API 216 (4). On the vendor side, this request is received at API 222 (5) and the processor 224 executes the steps in the notarization protocol (6). Processor 224 may leverage the artifact data stored in software artifact storage 240 to execute the steps in the proof algorithm (7). This artifact data is not returned to the notarizer but stays with the vendor for security purposes. All notarization steps and data generated during the notarization are bundled into a disclosure-free certificate that is then stored in notarization certificate storage 230 (8). The detailed notarization process is described in FIG. 4.

FIG. 3 illustrates a system for authenticating a disclosure-free notarization certificate according to some embodiments. As shown, system 300 is on the software consumer side and includes target runtime 310, validation component 320, notarization certificate storage 330, and software artifact storage 340. Validation component 320 is configured to validate a software artifact stored within software artifact storage 340 before it can be deployed to actual runtime in target runtime 310. As shown, validation component 320 is coupled to notarization certificate storage 330 to access disclosure-free certificates and software artifact storage 340 to access software artifacts. Validation component 320 may perform validation steps (9), which include retrieving a disclosure-free notarization certificate (10) and retrieving a corresponding software artifact (11). The detailed validation process is described in FIG. 5.

Figure 4:
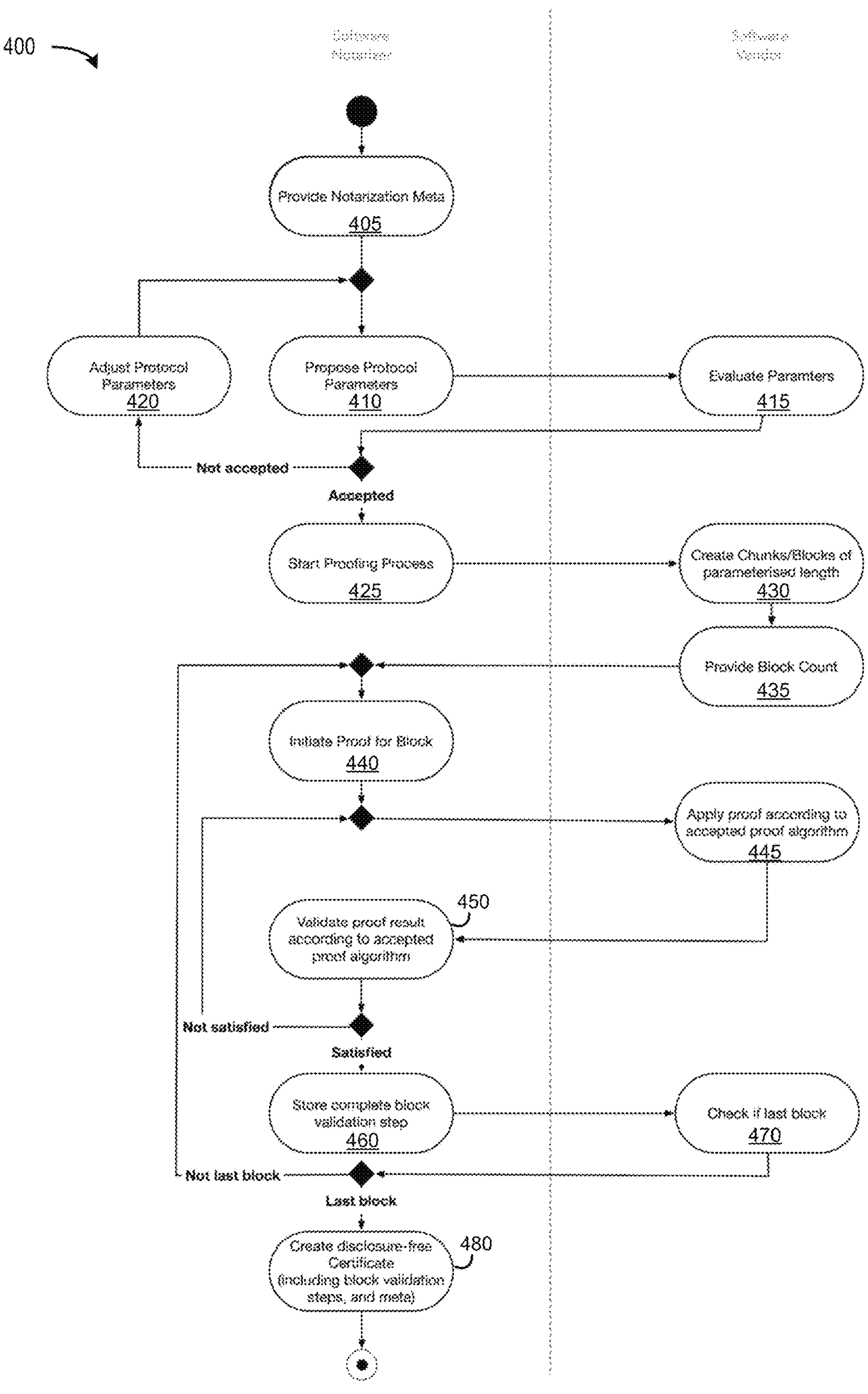
FIG. 4 illustrates a workflow for generating a disclosure-free notarization certificate according to some embodiments.

FIG. 4 illustrates a workflow for generating a disclosure-free notarization certificate according to some embodiments. Workflow 400 may be performed by a software notarizer and a software vendor as the two parties communicate with one another to generate the notarization certificate. The steps performed by the software notarizer may be stored as software code accessible by the software notarizer. Similarly, the steps performed by the software vendor may be stored as software code accessible by the software vendor. In one example, software code for the software vendor may be stored in software artifact storage 240 and executed by processor 224 within notarization adapter 220 in FIG. 2. In other examples, the software code for the software vendor may be stored in other computer readable media that is accessible by the software vendor. Similarly, software code for the software notarizer may be stored within notarization certificate storage 230 and executed by orchestrator 214 of notarization manager 210 of FIG. 2. In other examples, the software code for the software notarizer may be stored in other computer readable media that is accessible by the software notarizer. Generation of the notarization certificate may be completed without the software notarizer receiving any portion of the software artifact. This may provide an additional layer of security to the software vendor as it limits the number of parties who have access to the software artifact. In general, the process to generate the notarization certificate may run in several steps, based on the size of the software artifact. If the software artifact is sufficiently large, the proof of the algorithm shall be done by proofing smaller chunks or blocks of the software artifact by dividing the original software artifact into reproducible smaller blocks.

Workflow 400 begins with the software notarizer providing the notarization metadata at step 405. The metadata may include the application name, application ID, software vendor ID, and URL to the vendor's notarization adapter, to name a few. Workflow 400 may continue by having the software notarizer propose protocol parameters and transmit the proposed parameters to the software vendor at step 410. In some embodiments, the protocol parameters may include which proof algorithm to use, what number of proof blocks shall be used, what thresholds to apply, the size of the artifact blocks, and so on. In one embodiment, the proof algorithm may be a zero-knowledge proof algorithm. The software vendor evaluates the proposed parameters and decides whether the parameters are acceptable by the software vendor at step 415. If the protocol parameters are not acceptable (e.g., the software vendor does not support the proposed proof algorithm), then the software vendor may notify the software notarizer that the protocol parameters are unacceptable and the software notarizer may adjust the protocol parameters at step 420 and then re-propose the protocol parameters by transmitting the updated protocol parameters to the software vendor for review at step 410. In one embodiment, the software vendor may identify which protocol parameters are unacceptable. In another embodiment, the software vendor may not identify the unacceptable parameters and simply inform the software notarizer that the set of protocol parameters are unacceptable. Deciding whether to identify the unacceptable parameters may affect the security level of the process and also the efficiency of the process. This handshake may continue until both the software notarizer, and the software vendor have found an acceptable protocol parameter set. It may be advantageous for the software notarizer to propose protocol parameters and for the software vendor to accept or deny the protocol parameters since neither party defines the protocol parameters independently, which adds a layer of security. For example, the software vendor is unable to select the proof algorithm to use since it can only either accept or deny the proof algorithm proposed by the software notarizer. Similarly, the software notarizer cannot independently select the proof algorithm to use since the software vendor needs to accept the proposal.

Once an acceptable set of protocol parameters have been defined, the process continues and the software notarizer can start the proof process at step 425. The notarization process can start with the software vendor partitioning or segmenting the software artifact into a plurality of blocks or chunks based on the protocol parameters at step 430. In one embodiment, the blocks or chunks may be based on a block size defined in the protocol parameters as a parameterized length. In another embodiment, the blocks or chunks may be based on a desired number of blocks defined in the protocol parameters. Once the software vendor has created all respective blocks based on the agreed block sizes, the software vendor provides the total count of blocks back to the notarizer at step 435. This way, the software notarizer knows how many proofs will be generated for storage.

Figure 6:
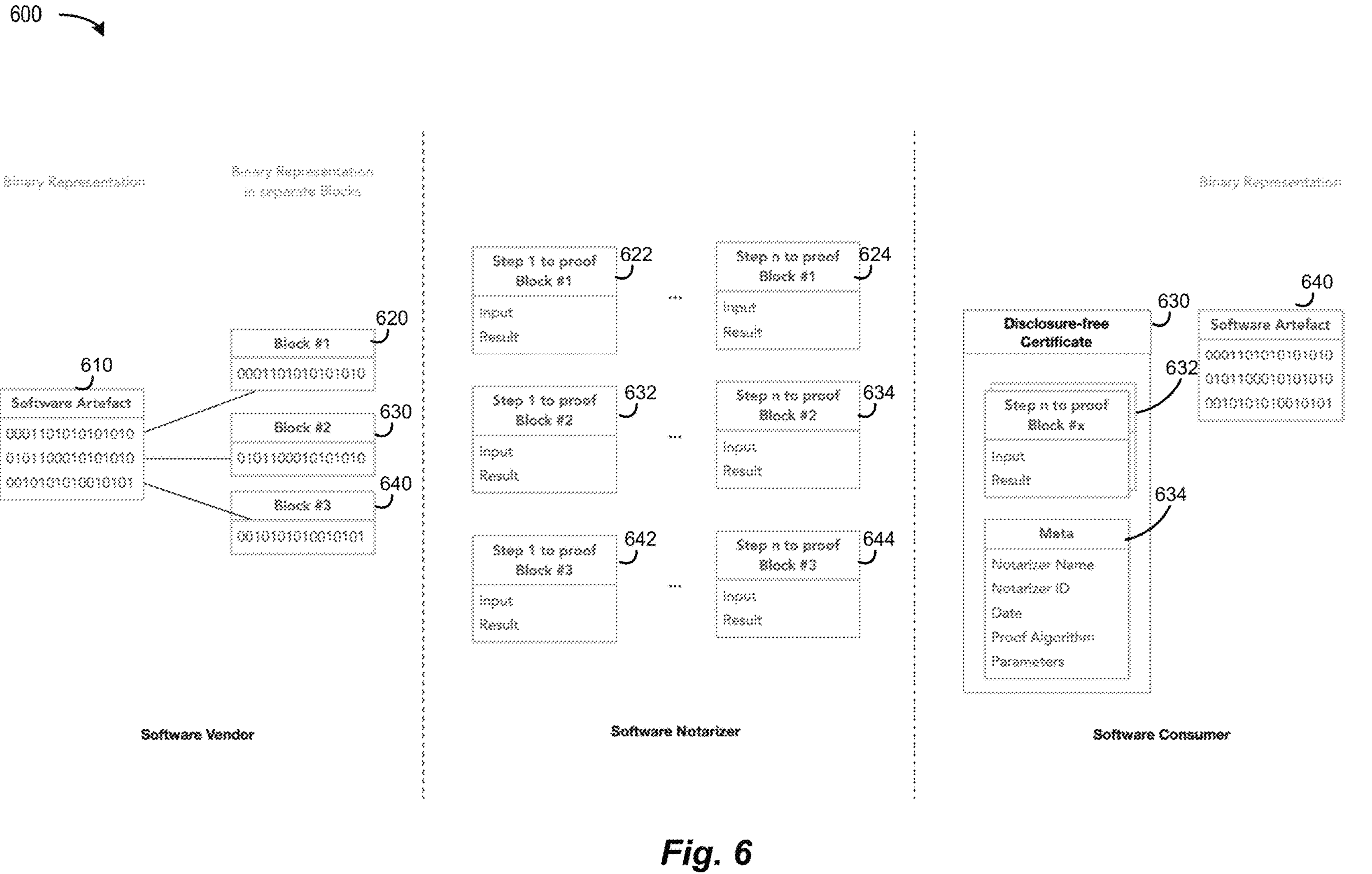
FIG. 6 illustrates the data model according to some embodiments.

Once the notarizer receives the total block count, the notarizer then initiates the proof for the first block in the block sequence at step 440 by notifying the software vendor to start the proofing process. On software vendor side, the agreed algorithm for proof of authenticity is then executed on the first block at step 445. The results from execution of the proof algorithm are provided back to the software notarizer which in turn validates that the result provided is okay in the context of the agreed proof algorithm at 450. In one embodiment, the validation may take the input the notarizer provided to the vendor and the vendors results and apply the input again to see whether the same result occurs. As some algorithms may rely on statistical proof methods, the notarizer might decide that the proof was not sufficient and re-query a proof for a given block. This may be due to the potential statistical nature of the proof algorithm may require multiple runs to take place. In this instance, the software vendor would execute the proof algorithm for the given block again. This would be considered the second step of the proof. Once a satisfactory proof for that specific block is achieved, the software notarizer may store the completed block validation at step 460. The completed block validation may include each step of the proof (each iteration that the proof algorithm is executed), wherein the input and proof result is stored for each step. An example of the information stored for each step is shown in FIG. 6. Software vendor may check to see whether this was the last block at step 470. If it is the last block, then software notarizer may continue by creating the disclosure-free notarization certificate by bundling all block validation steps and the protocol parameters at 480. If the just processed block was not the last block, the workflow 400 can continue by initiating the proof for the next block at 440. This process may continue until the proof algorithm has been applied to all blocks of the software artifact.

Figure 5:
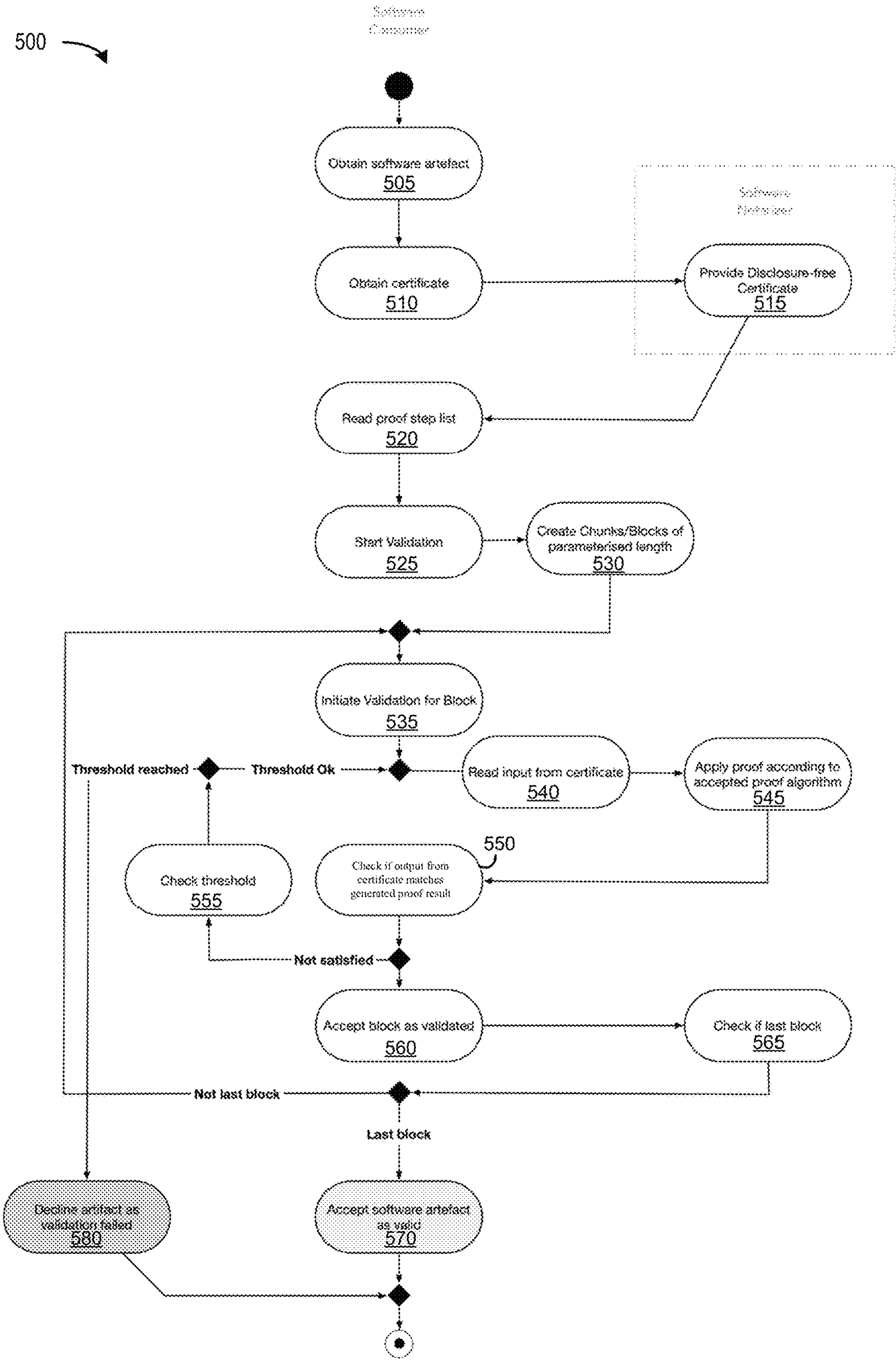
FIG. 5 illustrates a workflow for using a disclosure-free notification certificate to validate a software artifact according to some embodiments.

FIG. 5 illustrates a workflow for using a disclosure-free notification certificate to validate a software artifact according to some embodiments. Workflow 500 may be performed by a software consumer to authenticate a software artifact by using only the software artifact and the disclosure-free certificate. This authentication step may be performed prior to runtime of the software artifact for the first time or for each time. In one embodiment, the disclosure-free certificate is provided by the software notarizer. The steps performed by the software consumer may be stored as software code accessible by the software consumer and can be executed by the software consumer. In one example, the software code can be stored in notarization certificate storage 330 or software artifact storage 340 in FIG. 3. In other examples, the software code may be stored in other computer readable media accessible by the software consumer. The software code can be executed by validation component 320 in FIG. 3. If the authentication succeeds, then the software artifact is validated based on the disclosure-free notarization certificate. If the authentication fails, then the software artifact is not authentic with respect to the notarization certificate. This may mean that the software artifact is not authentic (potentially has been tampered with), the notarization certificate has been tampered with, or that the wrong notarization certificate has been used.

Workflow 500 begins by obtaining the software artifact at step 505 and obtaining the corresponding notarization certificate at step 510. In one embodiment, the software artifact is obtained from the software artifact storage 340 in FIG. 3 and the notarization certificate is obtained from the notarization certificate storage 330 in FIG. 3. If the notarization certificate is not stored with the software consumer, the software consumer may contact the software notarizer to provide the disclosure-free notarization certificate at step 515. Once the consumer has obtained both the software artifact and disclosure-free certificate, the software consumer may read a list of validation steps from the disclosure-free certificate at step 520. The validation steps are also known as the proof steps. The software consumer may then start the validation at step 525. First, the software consumer may partition the software artifact into a plurality of chunks (also known as blocks) having a parameterized length at step 530. The parameterized length or number of blocks may be defined by the protocol parameters stored within the disclosure-free certificate.

In some embodiments, the plurality of chunks or blocks may be processed sequentially. Software consumers may initiate validation of the first block at step 535. Validation of a given chunk or block may take place by having the software consumer perform the proof interaction and compare it with the recorded proof result stored in the notarization certificate. In this way, the validation component acts as both, proofer and verifier. The verification process for a given block may start by reading the input data for the given block from the notarization certificate at step 540. The software consumer may then apply the proof according to the proof algorithm at step 545. In one embodiment, applying the proof includes executing the proof algorithm on the input data and the current block and generating a proof result. In one embodiment, the input data utilized by the proof algorithm may be the same input data that was used as input by the software vendor during notarization. Once the proof result has been generated from the input data by the proof algorithm, the software consumer then checks if the proof result stored in the notarization certificate matches the proof result generated by the software consumer at 550. Sometimes if the proof results do not match, this may be due to the potential statistical nature of the proof algorithm. In other words, subsequent runs of the proof algorithm on the same input data may generate slightly different proof results. Each subsequent run may be called an additional step in the proof algorithm. As such, additional execution of the proof algorithm on the input data may be required to generate a proof result that matches the proof output stored within the notarization certificate. If the proof output does not match the proof result, software consumer may check the threshold at step 555 to determine whether a threshold number of runs has been reached. If the software consumer has run the proof algorithm on the input data already the threshold number of runs, then the threshold has been reached and the software consumer may complete the validation process by declining the software artifact as valid and conclude that the validation has failed at step 580. If instead the threshold has not been reached, software consumer may re-run the proof algorithm to see whether the newly generated proof result matches the proof result stored in the notarization certificate.

If instead the proof results do match, then the software consumer may conclude that the current block is validated at step 560 and check whether the current block is the last block in the software artifact at step 565. If it is the last block, then all blocks of the software artifact have been validated and the software consumer can accept the software artifact as valid and authentic in the context of the used notarization certificate. The software artifact can then be executed as part of a productive software deployment. If instead there are additional blocks, software consumer may continue by initiating validation of the next block at step 535. This process may continue until validation has been performed on all blocks or a block has failed validation.

FIG. 6 illustrates the data model according to some embodiments. As shown data model 600 includes software artifact 610 on the software vendor side. Software vendors may split or partition the software artifact into chunks or blocks for further processing during the generation of the notarization certificate. As shown, software artifact 610 may be partitioned, split, or separated into blocks 620, 630, and 640. For each block, the chosen proof algorithm may be executed by the software vendor per request from the software notarizer. The software notarizer may store the input data it provides to the software vendor for each block and also the respective proof result generated by the software vendor when executing the proof algorithm on the given block. As shown, the software notarizer stores information to proof block #1 620. Here, n number of steps have been performed to proof block #1 620 and is stored as step 1 622 to step n 624. Each step of the proof may include input data and the proof result generated from the proof algorithm. Similarly, software notarizer stores information to proof block #2 630 as step 1 632 to step n 634 and proof block #3 640 as step 1 642 to step n 644. Storing the input and the proof result for each step allows the notarizer to generate a notarization certificate that does not expose any actual data from the blocks, thereby improving the security of the software artifact. The software notarizer may bundle the meta information such as the protocol parameters along with all the steps to proof each block into the disclosure-free notarization certificate for later use in the software consumer validation process. As a notable outcome, the software notarizer neither requires access nor stores any software artifact data. In addition, certificates can be digitally signed, or any other level of encryption or verification can be applied in addition. However, those mechanisms do not change the nature of the disclosure-free certification process, but rather add additional layers of security and authenticity to the actual certificate as an entity.

While the introduced invention does not rely on one specific proof algorithm, but rather utilizes those algorithms in an abstract sense by making all involved parties agree on one common algorithm with aligned parameters and process flows, some examples might help to illustrate the concept of disclosure-free certificates based on the idea of zero-knowledge proofs. Zero-knowledge proofs are a cryptographic technique that allows one party, the prover, to demonstrate knowledge of certain information to another party, the verifier, without revealing any details about that information. This is achieved by using complex mathematical algorithms and cryptographic protocols. In one example, the proof algorithm is a Zero-knowledge Proof of Discrete Logarithm with Coin Flip. In another example, the proof algorithm is a generalization through Schnorr's Protocol. In yet another example, the proof algorithm is an algorithm leveraging pure prime numbers. In yet another example, the proof algorithm is a protocol based on Elliptic Curve Cryptography (ECC).

In a version of the Discrete Logarithm Proof by coin-flip proof algorithm, the prover (here the software vendor) and verifier (here the software notarizer) engage in a series of interactions. The prover starts by selecting a random number and computing a value based on the discrete logarithm. The verifier then chooses a random bit (0 or 1) and sends it to the prover. Next, the prover performs a calculation based on the bit received from the verifier and sends the result back. This process is repeated several times. At the end of the interactions, the verifier can check if the prover's responses are consistent with the chosen bits. If they are, the verifier becomes convinced that the prover knows the discrete logarithm without gaining any knowledge about the actual value. This protocol is embedded in the process outlined in FIG. 4 and repeated for each artifact block.

Figure 7:
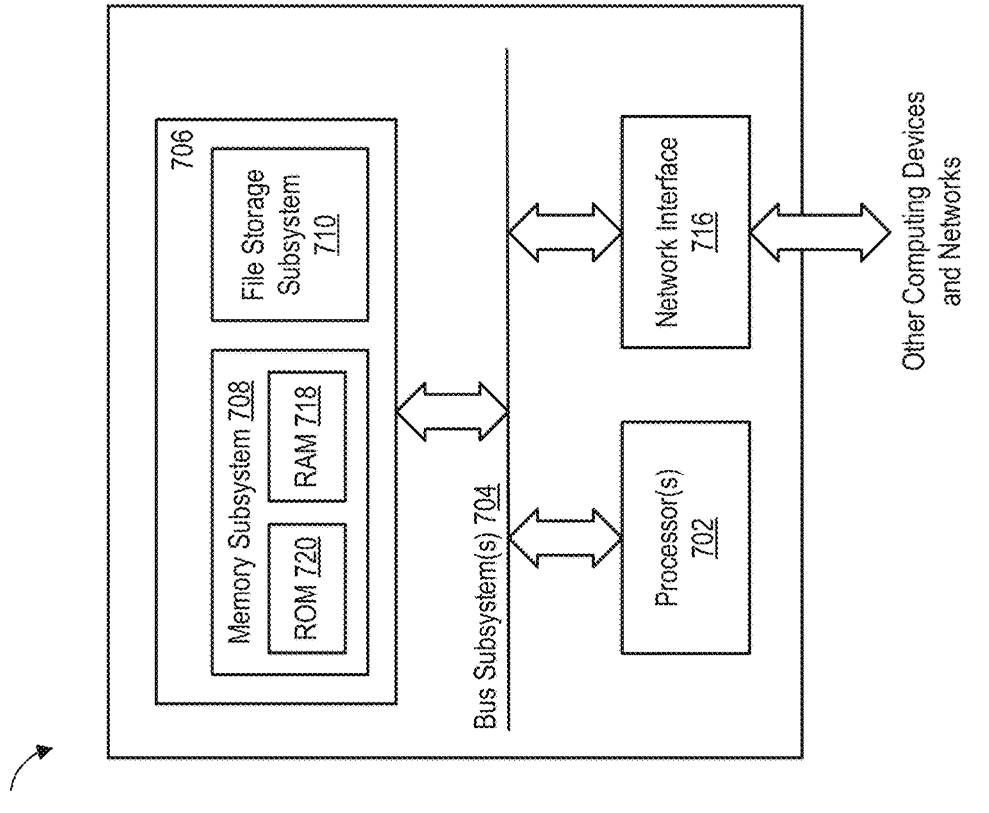
FIG. 7 depicts a simplified block diagram of an example computer system 400, which can be used to implement some of the techniques described in the foregoing disclosure.

FIG. 7 depicts a simplified block diagram of an example computer system 700, which can be used to implement some of the techniques described in the foregoing disclosure. As shown in FIG. 7, system 700 includes one or more processors 702 that communicate with several devices via one or more bus subsystems 704. These devices may include a storage subsystem 706 (e.g., comprising a memory subsystem 708 and a file storage subsystem 710) and a network interface subsystem 716. Some systems may further include user interface input devices and/or user interface output devices (not shown).

Bus subsystem 704 can provide a mechanism for letting the various components and subsystems of system 700 communicate with each other as intended. Although bus subsystem 704 is shown schematically as a single bus, alternative embodiments of the bus subsystem can utilize multiple buses.

Network interface subsystem 716 can serve as an interface for communicating data between system 700 and other computer systems or networks. Embodiments of network interface subsystem 716 can include, e.g., Ethernet, a Wi-Fi and/or cellular adapter, a modem (telephone, satellite, cable, etc.), and/or the like.

Storage subsystem 706 includes a memory subsystem 708 and a file/disk storage subsystem 710. Subsystems 708 and 710 as well as other memories described herein are examples of non-transitory computer-readable storage media that can store executable program code and/or data that provide the functionality of embodiments of the present disclosure.

Memory subsystem 708 comprise one or more memories including a main random access memory (RAM) 718 for storage of instructions and data during program execution and a read-only memory (ROM) 720 in which fixed instructions are stored. File storage subsystem 710 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that system 700 is illustrative and many other configurations having more or fewer components than system 700 are possible.

The above description illustrates various embodiments of the present invention along with examples of how aspects of the present invention may be implemented. The above examples and embodiments should not be deemed to be the only embodiments and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

FURTHER EXAMPLES

Each of the following non-limiting features in the following examples may stand on its own or may be combined in various permutations or combinations with one or more of the other features in the examples below. In various embodiments, the present disclosure may be implemented as a processor or method.

In some embodiments the present disclosure includes a method to generate a disclosure-free notarization certificate for a software artifact comprising defining a plurality of protocol parameters to utilize during notarization, the plurality of protocol parameters including a proof algorithm, negotiating the plurality of protocol parameters with a software vendor, receiving at least one proof result from the software vendor, the at least one proof result generated using the proof algorithm, validating the at least one proof result according to the proof algorithm, and bundling the at least one proof result after validation to generate the disclosure-free notarization certificate.

In one embodiment, the proof algorithm is a zero-knowledge proof algorithm.

In one embodiment, negotiating the plurality of protocol parameters with the software vendor includes: proposing the proof algorithm to the software vendor, receiving feedback as to whether the software vendor accepts the proof algorithm, and proposing a different proof algorithm to the software vendor based on the feedback.

In one embodiment, a proof result is associated with a portion of the software artifact.

In one embodiment, the software artifact is partitioned into a plurality of blocks and a plurality of proof results are received from the software vendor, wherein each proof result is associated with a block from the plurality of blocks.

In one embodiment, validating the at least one proof result includes: applying the proof algorithm to analyze the at least one proof result, and requesting the software vendor provide another proof result in response to the analysis.

In one embodiment, the disclosure-free notarization certificate further includes the protocol parameters.

In some embodiments, the present disclosure includes a system for processing an audible command, comprising one or more processors, a non-transitory computer-readable medium storing a program executable by the one or more processors, the program comprising sets of instructions for defining a plurality of protocol parameters to utilize during notarization, the plurality of protocol parameters including a proof algorithm, negotiating the plurality of protocol parameters with a software vendor, receiving at least one proof result from the software vendor, the at least one proof result generated using the proof algorithm, validating the at least one proof result according to the proof algorithm, and bundling the at least one proof result after validation to generate the disclosure-free notarization certificate.

In some embodiments, the present disclosure includes a non-transitory computer-readable medium storing a program executable by one or more processors, the program comprising sets of instructions for: defining a plurality of protocol parameters to utilize during notarization, the plurality of protocol parameters including a proof algorithm, negotiating the plurality of protocol parameters with a software vendor, receiving at least one proof result from the software vendor, the at least one proof result generated using the proof algorithm, validating the at least one proof result according to the proof algorithm, and bundling the at least one proof result after validation to generate the disclosure-free notarization certificate.

What is claimed is:

1. A computer-implemented method to generate a notarization certificate for a software artifact performed on a circuit including one or more processors, a bus, and a memory, the computer-implemented method comprising:

defining a plurality of protocol parameters to utilize during notarization, the plurality of protocol parameters including a zero-knowledge proof algorithm configured to verify correctness of the software artifact without revealing internal details thereof, wherein the software artifact comprises software code is partitioned into a plurality of blocks for cryptographic proof operations and a plurality of proof results are received from a software vendor, wherein each proof result is associated with a block from the plurality of blocks;

negotiating, with a software vendor, the plurality of protocol parameters to obtain negotiated protocol parameters, the negotiating comprising performing a multi-round exchange including:

proposing a first zero-knowledge proof algorithm;

receiving vendor feedback as to whether the software vendor accepts the first zero-knowledge proof algorithm, and selecting a second zero-knowledge proof algorithm and related security constraints based on the vendor feedback;

receiving at least one proof result from the software vendor, the at least one proof result generated using the zero-knowledge proof algorithm, the proof result providing compliance of the software artifact with the security constraints and the negotiated protocol parameters;

validating, by applying the zero-knowledge proof algorithm, the at least one proof result according to a verifier-side execution of the negotiated protocol parameters, and requesting an updated proof result from the software vendor in response to a verification failure; and bundling, by a certificate-generation module, the at least one proof result after validation to generate the notarization certificate, wherein the notarization certificate that includes the protocol parameters and confirms security or compliance properties of the software artifact without exposing proprietary or sensitive implementation details.

2. The method as in claim 1, wherein a proof result is associated with a portion of the software artifact.

3. The method as in claim 1, wherein validating the at least one proof result includes:

applying the zero-knowledge proof algorithm to analyze the at least one proof result; and requesting the software vendor provide another zero-knowledge proof result in response to the analysis.

4. A system for generating a notarization certificate for a software artifact comprising:

a circuit comprising:

one or more processors;

a memory;

a bus; and a non-transitory computer-readable medium storing a program executable by the one or more processors, the program comprising sets of instructions for:

defining a plurality of protocol parameters to utilize during notarization, the plurality of protocol parameters including a zero-knowledge proof algorithm configured to verify correctness of the software artifact without revealing internal details thereof, wherein the software artifact comprises software code is partitioned into a plurality of blocks for cryptographic proof operations and a plurality of proof results are received from a software vendor, wherein each proof result is associated with a block from the plurality of blocks;

negotiating, with a software vendor, the plurality of protocol parameters to obtain negotiated protocol parameters, the negotiating comprising performing a multi-round exchange including:

proposing a first zero-knowledge proof algorithm;

receiving vendor feedback as to whether the software vendor accepts the first zero-knowledge proof algorithm, and selecting a second zero-knowledge proof algorithm and related security constraints based on the vendor feedback;

receiving at least one proof result from the software vendor, the at least one proof result generated using the zero-knowledge proof algorithm, the at least one proof result providing compliance of the software artifact with the security constraints and the negotiated protocol parameters;

validating, by applying the zero-knowledge proof algorithm, the at least one proof result according to a verifier-side execution of the negotiated protocol parameters, and requesting an updated proof result from the software vendor in response to a verification failure; and bundling, by a certificate-generation module, the at least one proof result after validation to generate the notarization certificate, wherein the notarization certificate that includes the protocol parameters and confirms security or compliance properties of the software artifact without exposing proprietary or sensitive implementation details.

5. The system of claim 4, wherein a proof result is associated with a portion of the software artifact.

6. The system of claim 4, wherein validating the at least one proof result includes:

applying the zero-knowledge proof algorithm to analyze the at least one proof result; and requesting the software vendor provide another zero-knowledge proof result in response to the analysis.

7. A non-transitory computer-readable medium storing a program executable by a circuit including, a bus, and one or more processors, the program for generating a notarization certificate for a software artifact, the program comprising sets of instructions for:

defining a plurality of protocol parameters to utilize during notarization, the plurality of protocol parameters including a zero-knowledge proof algorithm configured to verify correctness of the software artifact without revealing internal details thereof, wherein the software artifact comprises software code is partitioned into a plurality of blocks for cryptographic proof operations and a plurality of proof results are received from a software vendor, wherein each proof result is associated with a block from the plurality of blocks;

negotiating, with a software vendor, the plurality of protocol parameters to obtain negotiated protocol parameters, the negotiating comprising performing a multi-round exchange including:

proposing a first zero-knowledge proof algorithm;

receiving vendor feedback as to whether the software vendor accepts the first zero-knowledge proof algorithm, and selecting a second zero-knowledge proof algorithm and related security constraints based on the vendor feedback;

receiving at least one proof result from the software vendor, the at least one proof result generated using the zero-knowledge proof algorithm, the at least one proof result providing compliance of the software artifact with the security constraints and the negotiated protocol parameters;

validating, by applying the zero-knowledge proof algorithm, the at least one proof result according to a verifier-side execution of the negotiated protocol parameters, and requesting an updated proof result from the software vendor in response to a verification failure; and bundling, by a certificate-generation module, the at least one proof result after validation to generate the notarization certificate, wherein the notarization certificate that includes the protocol parameters and confirms security or compliance properties of the software artifact without exposing proprietary or sensitive implementation details.

8. The non-transitory computer-readable medium of claim 7, wherein validating the at least one proof result includes:

applying the proof algorithm to analyze the at least one proof result; and requesting the software vendor provide another proof result in response to the analysis.

9. The non-transitory computer-readable medium of claim 7, wherein a proof result is associated with a portion of the software artifact.

* * * * *